H. HOWARD.

FUME ARRESTER.

APPLICATION FILED FEB. 3, 1909

Reissued Mar. 8, 1910.

13,090.

Witnesses

C. M. Walker.

C. H. Potter.

Inventor

Henry Howard by

Byrnes Townsend & Brickenstein

Attorneys

UNITED STATES PATENT OFFICE.

HENRY HOWARD, OF BOSTON, MASSACHUSETTS.

FUME-ARRESTER.

13,090. Specification of Reissued Letters Patent. Reissued Mar. 8, 1910.

Original No. 896,111, dated August 18, 1908, Serial No. 384,632. Application for reissue filed February 3, 1909. Serial No. 475,939.

*To all whom it may concern:*

Be it known that I, HENRY HOWARD, a citizen of the United States, residing at Boston, in the county of Suffolk and State of Massachusetts, have invented certain new and useful Improvements in Fume-Arresters, of which the following is a specification.

This apparatus is specially designed to remove suspended particles of solid matter from the hot gases escaping from roasting and smelting furnaces, but is applicable to the separation of dust from any gas-current of non-atmospheric temperature.

The apparatus, in its preferred form, comprises two parallel chambers each of which contains a considerable number of superposed horizontal shelves, vertical passages at the ends of these shelves serving to receive and deliver the gases by means of a valve-controlled inlet at the upper end of one passage and a valve-controlled outlet at the lower end of the other passage. The valves enable the gases to be delivered at will through either or both chambers.

Figure 1:
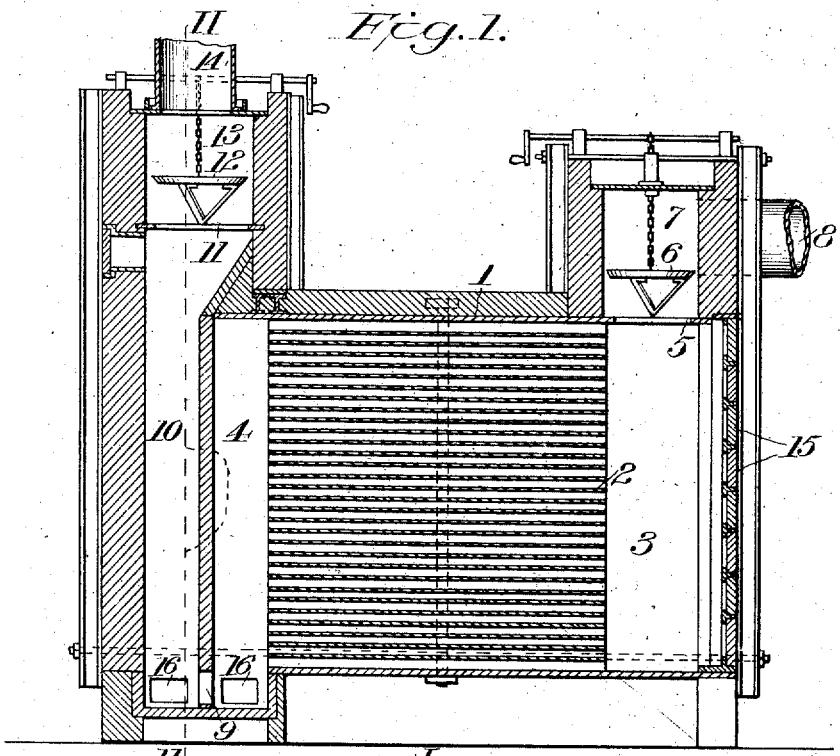
Figure 2:
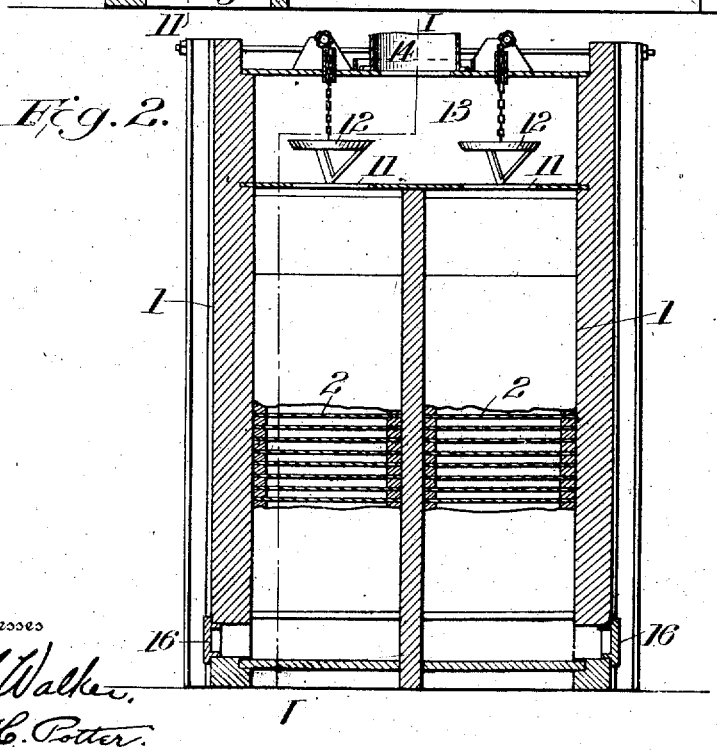

Referring to the accompanying drawings, which illustrate a specific apparatus for removing dust from the sulfurous gases produced in pyrites burners: Figure 1 is a longitudinal vertical section on the line I—I of Fig. 2; and Fig. 2 is a transverse vertical section on the line II—II of Fig. 1.

The apparatus illustrated comprises two parallel rectangular chambers 1, each of which contains a number of superposed horizontal shelves 2. At one end of each set of shelves is a vertical gas-supply passage 3 and at the other end is a vertical gas-discharge passage 4. At the upper end of the supply-passage 3 is a gas-inlet 5 controlled by valve 6. Above the valved inlets 5 of the two chambers 1 is a horizontal passage 7 to which the gases are supplied by pipe 8. At the lower end of the vertical passage 4 is an outlet 9 which delivers the gases into an uptake 10 having an outlet 11 controlled by a valve 12. A horizontal passage 13 having a delivery pipe 14 extends over the outlets 11 of both chambers. The outer wall of each chamber, at its receiving-end, is provided with a vertical series of removable tiles 15. Lateral cleaning-openings 16, with doors, are provided at the lower ends of the passages 4, 10.

In operation, the valves 6, 12 are opened and gases supplied through the pipe 8 pass into the horizontal chamber 7 and thence through the openings 5 into the vertical supply-passages 3. The entering gases then subdivide and pass between the shelves, whereon the dust is deposited. The gases leaving the shelves enter the discharge-passages 4 and escape through the openings 9, uptakes 10, openings 11, horizontal passage 13 and pipe 14. The collected dust may be removed from the shelves of either chamber without interrupting the flow of gases by closing its valves 6, 12, removing the tiles 15, forcing the dust from the shelves into the passage 4 and removing it at the bottom through the openings 16.

When the entering gases are evenly distributed between the several shelves, the efficiency of the apparatus varies directly as the number of shelves. In order to effect such even distribution of gases of non-atmospheric temperature, it is essential that the gas-inlet and outlet of each chamber be located respectively at the upper and lower ends of the vertical passages, or in the case of hot gases that the inlet be at the upper end of the vertical supply-passage and the outlet at the lower end of the vertical discharge-passage. This fact was determined by practical test of an apparatus provided with a gas-inlet and outlet both located at the top of the vertical passages, the efficiency of which was found to be actually lower than when the superposed shelves were omitted. When gases of superatmospheric temperature are introduced into a chamber externally cooled by the atmosphere, portions of the gases are partially cooled by the walls and subside, while the hot gases subsequently entering and escaping through openings at the top take the shortest path between these openings and pass between the upper shelves only, at such high velocity that little of the suspended dust is deposited. When the inlet and outlet are at the top and bottom, however, the distribution of gases between the different shelves is substantially perfect. If the hot gases begin to flow too rapidly between the upper shelves, the vertical column of gas in the discharge-passage acquires a relatively higher temperature and lower specific gravity than the gas-column in the supply-passage, the lower portion of which, moving slowly into the spaces between the bottom shelves, is abnormally cooled by prolonged contact with the outer walls and thereby densified. The relatively light gas-column in the discharge-passage thereupon exerts a back pressure and retards the escape of gases from the top shelves while the heavier gas-column in the supply-passage forces the gases between the lower shelves. The present arrangement of passages and openings thus effects an automatic compensation and even distribution of the gases and in practice substantially identical amounts of dust are deposited on the shelves at the top and bottom. The gas inlet and outlet, one at the upper end and the other at the lower end of the passages at the opposite ends of the superposed shelves, constitute, in connection with these passages, means for passing substantially equal amounts of gases of non-atmospheric temperature through all of the spaces between the shelves.

When the apparatus is employed to treat gases which are cooler than the atmosphere, the inlet is located at the bottom of the supply-passage and the outlet at the top of the discharge-passage. The apparatus shown in the drawing may be used for such cooler gases by introducing the gases through pipe 14 and delivering them through pipe 8.

By employing a large number of closely-spaced plates, it is possible to obtain a separation of solid particles practically as complete as that effected by a filter, while the shelves offer little resistance to the flow of gases.

I claim:

1. A fume-arrester comprising a chamber containing superposed dust-retaining shelves, passages at the opposite ends of said shelves, an inlet at the upper end of one passage, and an outlet at the lower end of the other passage, whereby a substantial uniformity of flow is secured between the shelves above said outlet.

2. A fume-arrester, comprising two chambers each containing superposed dust-retaining shelves, passages at the opposite ends of said shelves, an inlet at the upper end of one passage, and an outlet at the lower end of the other passage, and means for passing gases selectively through either or both chambers.

3. A fume-arrester, comprising two chambers each containing superposed dust-retaining shelves, passages at the opposite ends of said shelves, a valve-controlled inlet at the upper end of one passage, and a valve-controlled outlet at the lower end of the other passage.

4. A fume-arrester comprising a chamber containing superposed dust-retaining shelves, passages at the opposite ends of said shelves, an inlet at the upper end of one passage, an outlet at the lower end of the other passage, whereby a substantial uniformity of flow is secured between the shelves above said outlet, and an uptake communicating with said outlet.

5. A fume-arrester, comprising two chambers each containing superposed dust-retaining shelves, passages at the opposite ends of said shelves, a valve-controlled intake communicating with the upper end of one passage, and a valve-controlled uptake communicating with the lower end of the other passage.

6. A fume-arrester comprising a chamber containing closely spaced, superposed, dust-retaining shelves, means for passing gases of super-atmospheric temperature therethrough, and means for automatically regulating the passage of the gases to secure substantial uniformity of flow between the shelves.

In testimony whereof, I affix my signature in presence of two witnesses.

HENRY HOWARD.

Witnesses:
THOMAS JAMES SHANNON,
OSBORNE ISAIAH BEZANSON.